UNITED STATES PATENT OFFICE.

OTTO LIEBKNECHT, OF FRANKFORT-ON-THE-MAIN, GERMANY, ASSIGNOR TO ROESSLER AND HASSLACHER CHEMICAL CO., OF NEW YORK, N. Y., A CORPORATION OF NEW YORK.

STABLE HYDROGEN-PEROXID SOLUTION.

1,025,948.  Specification of Letters Patent.  Patented May 7, 1912.

No Drawing. Original application filed November 18, 1908, Serial No. 463,192. Divided and this application filed March 1, 1911. Serial No. 611,587.

*To all whom it may concern:*

Be it known that I, OTTO LIEBKNECHT, a subject of the Emperor of Germany, and a resident of Frankfort-on-the-Main, Germany, have invented a new and useful Stable Hydrogen Peroxid, of which the following is a specification, the same being a division of my application, Serial No. 463,192, filed November 18, 1908.

This invention relates to a stable hydrogen peroxid.

Heretofore strong mineral acids have been chiefly used in order to render hydrogen peroxid solutions stable, for instance, a certain quantity of phosphoric acid has been added to the hydrogen peroxid. The stability thus obtained is however of limited duration, as after a short time appreciable losses of active oxygen take place. The addition of mineral acid has, however, been considered necessary, as without it a quicker decomposition takes place. The action of the mineral acid is accounted for by the stronger electrolytic dissociation of the mineral acid, which lessens the dissociation of the exceptionally weak acid hydrogen peroxid and thus prevents decomposition.

The comparatively low degree of stability of the present hydrogen peroxid solutions, even with the addition of mineral acids, has been commercially a great drawback and medically the use of such acid hydrogen peroxid solutions is greatly retarded on account of causing irritation. There is also in the market 30% chemically pure hydrogen peroxid which, however, in order to preserve its stability, must be kept in paraffined bottles. This product has to be diluted before using and then undergoes the quick decomposition hereinabove described.

The object of the invention is to overcome the difficulties and disadvantages set forth.

The principle of the invention is founded on the observation that certain aromatic bodies having acid properties such as sulfanilic acid when added to an aqueous hydrogen peroxid solution, prepared in any way, renders the same stable, the addition of very small quantities showing surprising results as to stability, for example, the addition of 2 parts per thousand of sulfanilic acid to a 3% aqueous hydrogen peroxid solution (one part by weight 30% $H_2O_2$ and nine parts distilled water), after 12 weeks shows no loss in percentage of the hydrogen peroxid, while without such addition after 3 weeks 92.3% of the hydrogen peroxid is lost, after 4 weeks 99% of it is lost and after 12 weeks it is all lost. The action of the sulfanilic acid is also effective for aqueous solutions of hydrogen peroxid of any other concentration and I do not restrict myself to the degree of concentration set forth or to any specific proportion of sulfanilic acid to be used, various proportions of sulfanilic acid producing the results set forth when added to hydrogen peroxid solutions of various degrees of concentration.

What I claim and desire to secure by Letters Patent is:

A hydrogen peroxid solution containing sulfanilic acid.

In testimony whereof I have signed my name to this specification in the presence of two subscribing witnesses.

OTTO LIEBKNECHT.

Witnesses:
  JEAN GRUND,
  CARL GRUND.